(12) United States Patent
Sasaki et al.

(10) Patent No.: US 8,368,341 B2
(45) Date of Patent: Feb. 5, 2013

(54) HEAD UP DISPLAY DEVICE FOR VEHICLE

(75) Inventors: Tatsuya Sasaki, Chiryu (JP); Hideyuki Nakane, Nishio (JP); Kazuhide Ohta, Nagoya (JP)

(73) Assignee: Denso Corporation, Kariya (JP)

( * ) Notice: Subject to any disclaimer, the term of this patent is extended or adjusted under 35 U.S.C. 154(b) by 193 days.

(21) Appl. No.: 13/065,385

(22) Filed: Mar. 21, 2011

(65) Prior Publication Data

US 2011/0241596 A1 Oct. 6, 2011

(30) Foreign Application Priority Data

Mar. 30, 2010 (JP) .................................. 2010-79098

(51) Int. Cl.
G05B 19/40 (2006.01)
(52) U.S. Cl. ........................................ 318/685; 359/632
(58) Field of Classification Search .................. 318/685; 359/630, 632
See application file for complete search history.

(56) References Cited

U.S. PATENT DOCUMENTS

| | | | |
|---|---|---|---|
| 6,713,985 B2 | 3/2004 | Aoshima | |
| 6,809,872 B2 * | 10/2004 | Eberhardt et al. | 359/630 |
| 7,868,579 B2 | 1/2011 | Kumano | |
| 2008/0212196 A1 * | 9/2008 | Watanabe et al. | 359/632 |
| 2009/0218979 A1 * | 9/2009 | Yamasaki et al. | 318/600 |

FOREIGN PATENT DOCUMENTS

| | | |
|---|---|---|
| JP | 10-164893 | 6/1998 |
| JP | 2002-136189 | 5/2002 |
| JP | 2006-82593 | 3/2006 |
| JP | 2009-011087 | 1/2009 |
| JP | 2009-132221 | 6/2009 |

OTHER PUBLICATIONS

Office action dated Jun. 19, 2012 in corresponding Japanese Application No. 2010-079098.

* cited by examiner

*Primary Examiner* — Walter Benson
*Assistant Examiner* — Iftekhar Mustafa
(74) *Attorney, Agent, or Firm* — Harness, Dickey & Pierce, PLC

(57) ABSTRACT

A head up display device for a vehicle includes a display; an optical system having a reflecting mirror; a stepping motor; and a control system having a determining device, a micro-step control device, and a forcible control device. The determining device determines whether an adjustment command for micro-step control is given. The micro-step control device performs the micro-step control as long as the determining device determines that the command for the micro-step control is given. The forcible control device forcibly controls a drive signal such that an electrical angle changes to a stabilizing point. When determination made by the determining device switches from determination that the command is given to determination that the command is not given, the forcible control device forcibly controls the drive signal, provided that the electrical angle as of the time of the determination that the command is not given is shifted from the stabilizing point.

4 Claims, 5 Drawing Sheets

HEAD UP DISPLAY DEVICE FOR VEHICLE

CROSS REFERENCE TO RELATED APPLICATION

This application is based on and incorporates herein by reference Japanese Patent Application No. 2010-79098 filed on Mar. 30, 2010.

BACKGROUND OF THE INVENTION

1. Field of the Invention

The present invention relates to a head up display device for a vehicle.

2. Description of Related Art

Conventionally, a head up display device (hereinafter referred to as an HUD device) for a vehicle is known. The HUD device displays a light-emitting image on a display, and projects the display image onto a projection member such as a windshield. Accordingly, the HUD device displays a virtual image of vehicle-related information. As a type of such a HUD device, a device that reflects a display image of a display on a reflecting mirror such as a concave mirror and projects the reflected image onto a projection member is disclosed in JP-A-2009-132221. As described above, an installation space occupied by the HUD device in a vehicle is made small by the use of the reflecting mirror.

In an HUD device disclosed in JP-A-2009-132221, the following configuration is employed for adjusting a display position of a virtual image. That is, a drive signal in accordance with an adjustment command from the outside is applied to a stepping motor, and a rotatable reflecting mirror is rotated by the stepping motor. As a result of such a configuration, by giving the adjustment command to the HUD device, an occupant of a vehicle can display the virtual image of vehicle-related information in an easily visually identifiable state.

In the above-described HUD device disclosed in JP-A-2009-132221, the display position may be smoothly adjusted in accordance with the adjustment command to relate the display position of the virtual image finely to preference of a vehicle occupant. For a method for smoothly adjusting the display position of the virtual image in accordance with the adjustment command, a method for micro-step controlling the drive signal of the stepping motor, such that an electrical angle changes each time by a set angle that is smaller than an interval between stabilizing points, which appear at every predetermined electrical angle in accordance with detent torque in a stepping motor, is demanded. This is because significant cost rising can be reduced as compared to mechanical processes, such as the increase in the number of steps of the stepping motor or increase of a reduction ratio (gear ratio) on a motor output side through a reduction gear mechanism, since the micro-step control can be dealt with through electrical processing.

However, in the case of the above-described micro-step control, if the present electrical angle is out of the stabilizing point at the time of the stop of the adjustment command, a rotation retaining effect due to the detent torque is decreased, so that the stepping motor may lose steps because of impact force by such as external force action or vibration. In the stepping motor that has lost steps, discrepancy between a mechanical angle corresponding to a rotation angle of the reflecting mirror and the electrical angle is caused. Accordingly, reliability for the adjustment of the display position of the virtual image is decreased.

SUMMARY OF THE INVENTION

The present invention addresses at least one of the above disadvantages.

According to the present invention, there is provided a head up display device for a vehicle, including a display, an optical system, a stepping motor, and a control system. The display is configured to display a light-emitting image. The optical system includes a reflecting mirror, which is disposed rotatably relative to the display to reflect the image displayed by the display. The optical system is configured to project the image reflected on the reflecting mirror onto a projection member of the vehicle and to thereby display a virtual image of vehicle-related information on the projection member. The stepping motor is configured to rotate the reflecting mirror as a result of application of a drive signal to the stepping motor and thereby to adjust a display position of the virtual image. The drive signal has an amplitude in accordance with an electrical angle. A stabilizing point of the stepping motor appears at every predetermined electrical angle in accordance with detent torque of the stepping motor. The control system is configured to control the drive signal such that the electrical angle changes in accordance with an adjustment command from an outside. The control system includes a determining means, a micro-step control means, and a forcible control means. The determining means is for determining whether the adjustment command for micro-step control is given or not. Through the micro-step control, the drive signal is controlled such that the electrical angle changes by a set angle each time. The set angle is smaller than a stabilizing point interval. The micro-step control means is for performing the micro-step control as long as the determining means determines that the adjustment command for the micro-step control is given. The forcible control means is for forcibly controlling the drive signal such that the electrical angle changes to the stabilizing point. When determination made by the determining means whether the adjustment command for the micro-step control is given or not switches from determination that the adjustment command is given to determination that the adjustment command is not given, the forcible control means forcibly controls the drive signal, provided that the electrical angle as of a time of the determination that the adjustment command is not given is shifted from the stabilizing point.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION

An embodiment of the invention will be described below with reference to the accompanying drawings.

Figure 1:
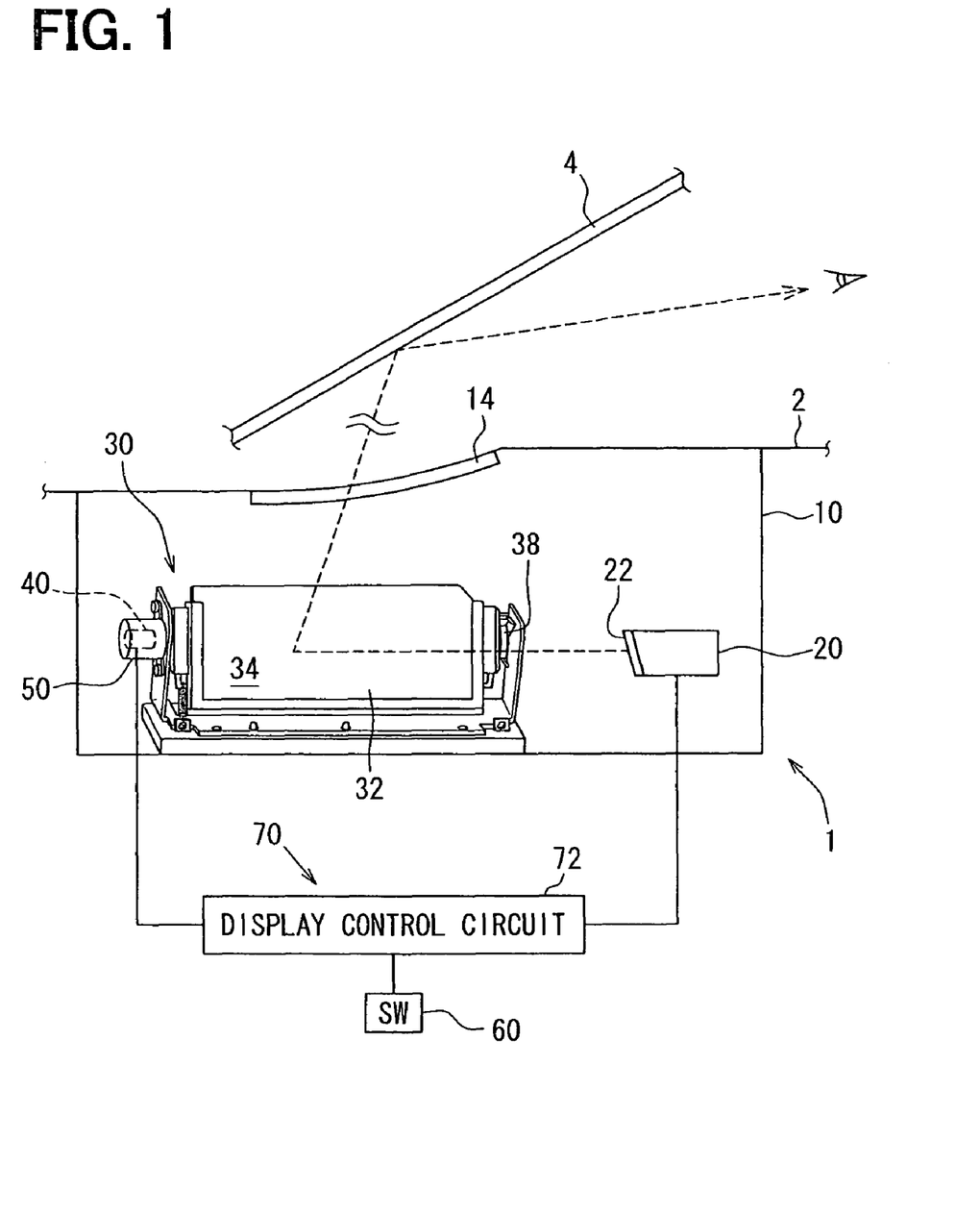
FIG. 1 is a diagram roughly illustrating configuration of an HUD device for a vehicle in accordance with an embodiment of the invention.

First, a basic configuration of an HUD device 1 for a vehicle in accordance with the embodiment will be described. The HUD device 1, which is disposed in the vehicle, includes a housing 10, a display 20, an optical system 30, a stepping motor 40, a reduction gear mechanism 50, a adjustment switch 60, and a control system 70.

The housing 10 is formed into a hollow shape accommodating the other elements 20, 30, 40, 50 and so forth in the HUD device 1, and provided at an instrument panel 2 of the vehicle. The housing 10 includes a translucent emission window 14 at its portion that is vertically opposed to a windshield 4 serving as a projection member. The windshield 4 is fixed in front of a driver's seat of the vehicle.

Figure 2:
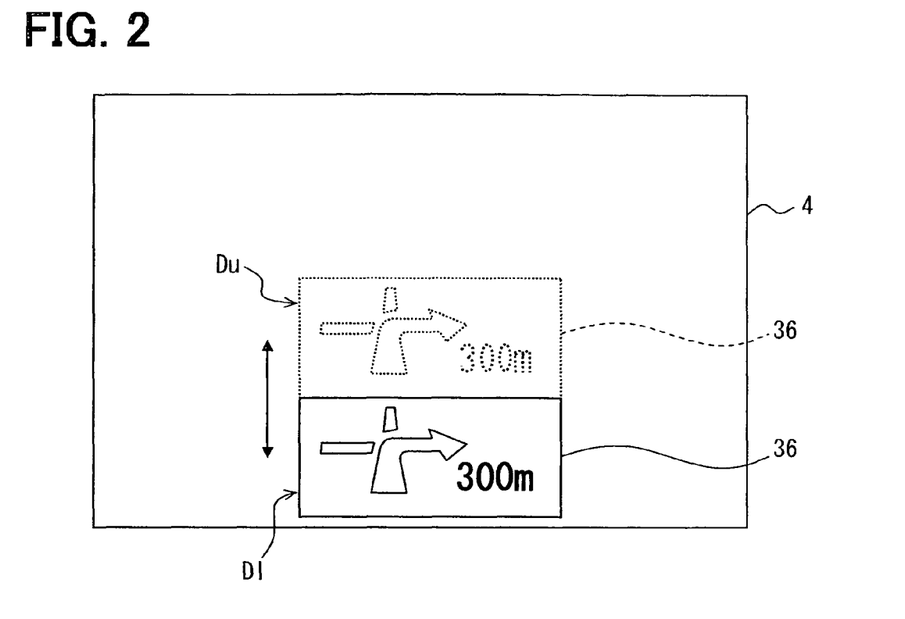
FIG. 2 is a schematic view illustrating a display state of a virtual image by the HUD device in FIG. 1.

The display 20 is, in the present embodiment, a transmitted illumination-type liquid crystal panel, and includes a screen 22 that displays an image. The screen 22 is transmissively illuminated with a built-in back light (not shown), so that the display 20 makes a display image on the screen 22 luminous. The light-emitting image displayed on the display 20 in this manner notifies, vehicle-related information which is related to a vehicle operation or vehicle state. In the present embodiment, navigation information such as a vehicle traveling direction (see FIG. 2) is notified. The display image of the display 20 may be those notifying physical quantity information such as vehicle speed, remaining fuel, and coolant temperature, or vehicle exterior status information such as a traffic situation and safety situation in addition to the navigation information.

The optical system 30 is composed of optical members (those except the reflecting mirror 32 are not shown) including a reflecting mirror 32, and emits the display image of the display 20 toward the emission window 14. In the present embodiment, the reflecting mirror 32 includes a concave mirror, and includes a reflecting surface 34 concaved in a shape of a smooth curved surface. The reflecting mirror 32 enlarges the display image as an optical image, which enters directly or indirectly from the display 20 into the reflecting surface 34, and reflects the image toward the emission window 14. The reflected image on the reflecting mirror 32 is projected onto the windshield 4 through the emission window 14, so that the image is formed in the front of the shielding 4. As a result, the vehicle-related information indicated by the display image of the display 20 is displayed on the driver's seat side in the vehicle as a virtual image 36 (see FIG. 2).

The reflecting mirror 32 includes a rotatable shaft 38 rotatably supported by the housing 10. As a result of the rotation of the rotatable shaft 38, the reflecting mirror 32 changes the display position of the virtual image 36 illustrated in FIG. 2 in the vertical direction relative to the windshield 4. Because of optical properties of the optical system 30 and the windshield 4, in the present embodiment, the display of the virtual image 36 is achieved between a lower limit display position Dl of the virtual image 36 indicated by a continuous line in FIG. 2 and an upper limit display position Du of the virtual image 36 indicated by a short dashes line in FIG. 2.

Figure 3:
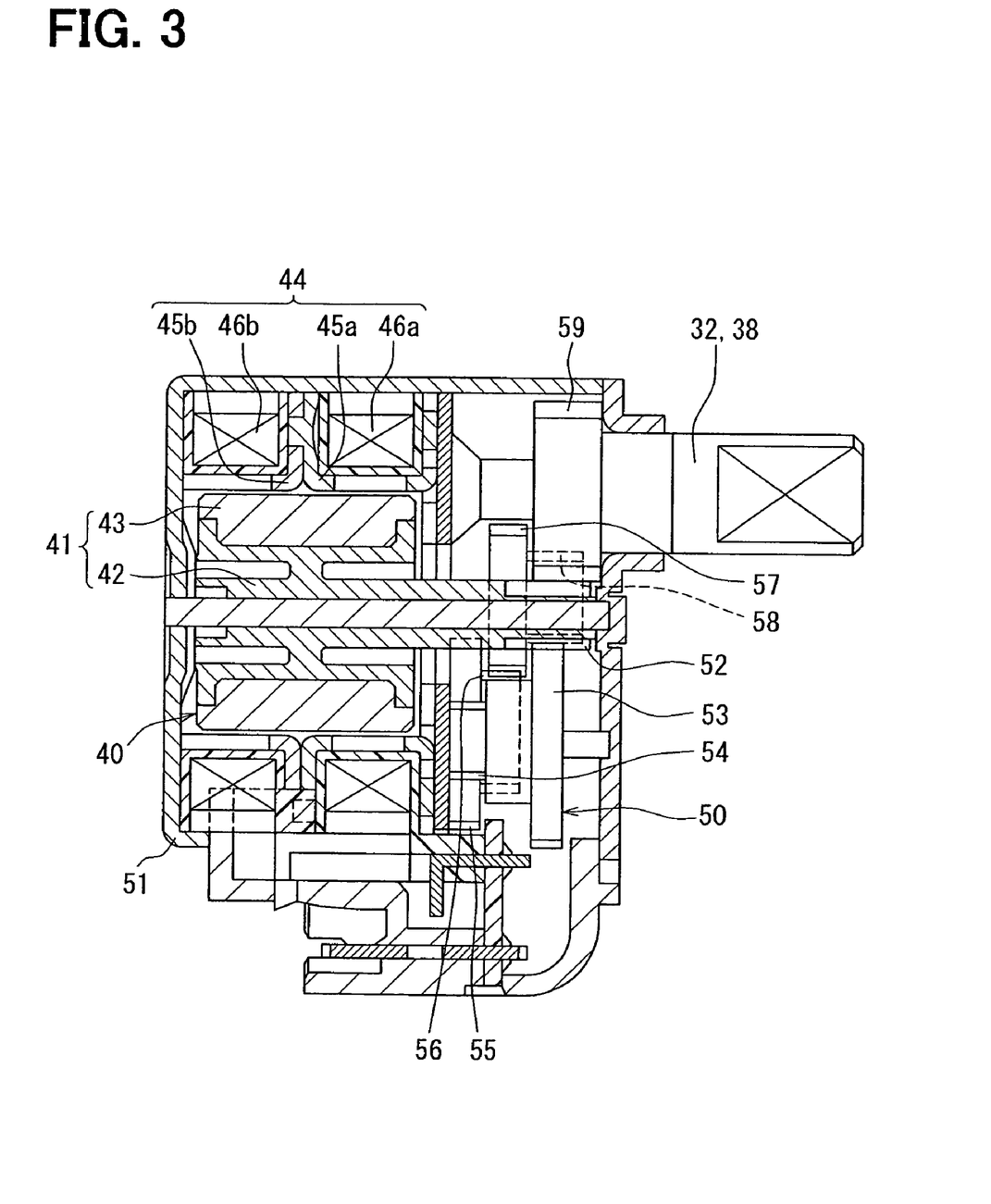
FIG. 3 is a sectional view illustrating a stepping motor and a reduction gear mechanism in FIG. 1.
Figure 4:
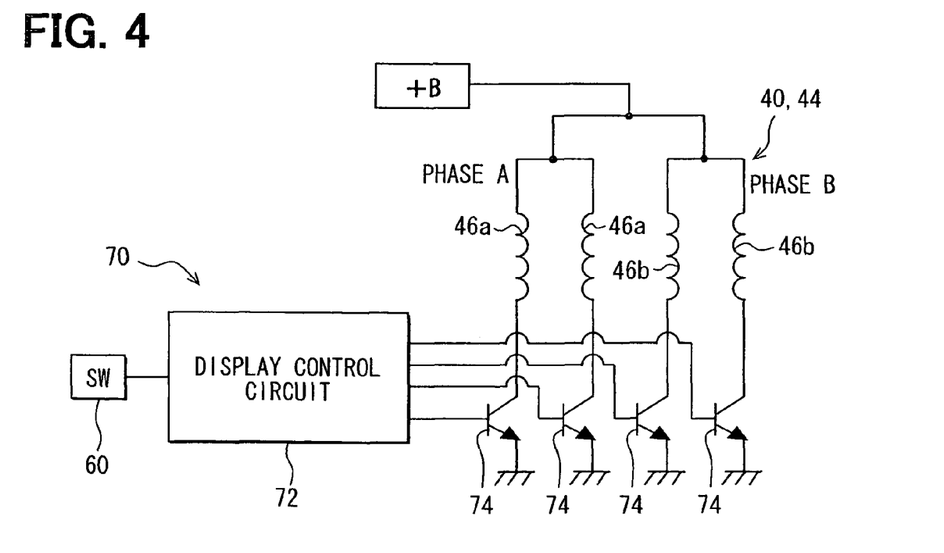
FIG. 4 is an electrical block diagram illustrating a connection state of the stepping motor and a control system in FIG. 1.

As illustrated in FIG. 3, in the present embodiment, the stepping motor 40 is of a permanent magnet type having a claw pole structure, and includes a rotor 41 and a stator 44. The rotor 41 is obtained by attaching a rotor magnet 43 on an outer peripheral side of a motor shaft 42 rotatably supported by a gear case 51, which is described in greater detail hereinafter. As illustrated in FIGS. 3 and 4, the stator 44 fixed to the gear case 51 is obtained as a result of the combination of a claw pole yoke 45a and a pair of coils 46a forming phase A, and a claw pole yoke 45b and a pair of coils 46b forming phase B. The stator 44 is obtained by arranging those claw poles of yokes 45a, 45b to be shifted from each other by ½ pitch by the mechanical angle.

The stepping motor 40 having such a configuration rotates the rotor magnet 43 as a result of the excitation of the coils 46a, 46b of respective phases A, B upon receiving a drive signal. Accordingly, motor torque is generated in the motor shaft 42. Furthermore, the stepping motor 40 is configured such that detent torque is generated in the motor shaft 42 due to interaction between these coils 46a, 46b and the rotor magnet 43 even in a magnetic neutral state in which the drive signal is not applied to all the coils 46a, 46b.

The reduction gear mechanism 50 is obtained by engaging gears 52 to 59 in series in the hollow-shaped gear case 51 accommodating the stepping motor 40. The first-step gear 52 is provided for the motor shaft 42, and the last-step gear 59 is provided for the rotatable shaft 38 of the reflecting mirror 32. Accordingly, the motor torque generated by the stepping motor 40 as a result of the rotation of its motor shaft 42 is amplified in accordance with reduction ratios (gear ratios) among the gears 52 to 59, and transmitted to the rotatable shaft 38. As a result, this motor torque becomes torque for rotating the reflecting mirror 32. When the stepping motor 40 is forward rotated, the reflecting mirror 32 is also forward rotated so that the display position of the virtual image 36 moves upwards. When the stepping motor 40 is reverse rotated, the reflecting mirror 32 is also reverse rotated so that the display position of the virtual image 36 moves downwards.

The adjustment switch 60 illustrated in FIGS. 1 and 4 is disposed so as to be pressed by an occupant on the driver's seat in the vehicle. The adjustment switch 60 includes, for instance, two push-type operating members such that the occupant can selectively input two types of commands: an upward adjustment command for moving the display position of the virtual image 36 upward; and a downward adjustment command for moving the display position of the virtual image 36 downward. The adjustment switch 60 outputs a command signal in accordance with the adjustment command inputted through the pressing operation.

The control system 70 is obtained as a result of the combination of a display control circuit 72 and switching elements 74, and disposed inside or outside the housing 10. In the present embodiment, the display control circuit 72 is an electric circuit configured mainly using a microcomputer, and electrically connected to the display 20 and the adjustment switch 60. As illustrated in FIG. 4, in the present embodiment, each switching element 74 is a transistor whose collector is connected to either one of the coils 46a, 46b, and its emitter and base are connected respectively to the ground (not shown) and the display control circuit 72. Each switching element 74 changes amplitudes of drive signals applied to the coils 46a, 46b of respective phases A, B in accordance with a gate signal inputted from the display control circuit 72. Accordingly, in the following description, control of the gate signal to the switching element 74 through the display control circuit 72 will be explained as being the control of the drive signals to the coils 46a, 46b.

In the control system 70 having the above-described configuration, the display control circuit 72 controls the display of the image through the display 20. At the same time, the display control circuit 72 controls the drive signals to the coils 46a, 46b of respective phases A, B in accordance with the command signal inputted from the adjustment switch 60. Specifically, in accordance with the upward adjustment command, the display control circuit 72 changes the display position of the virtual image 36 upwards through the control of electrical angles of the drive signals to the coils 46a, 46b of respective phases to forward rotate the reflecting mirror 32 together with the stepping motor 40. In accordance with the downward adjustment command, on the other hand, the display control circuit 72 changes the display position of the virtual image 36 downwards through the control of the electrical angles of the drive signals to the coils 46a, 46b of respective phases to reverse rotate the reflecting mirror 32 together with the stepping motor 40.

Figure 5A:
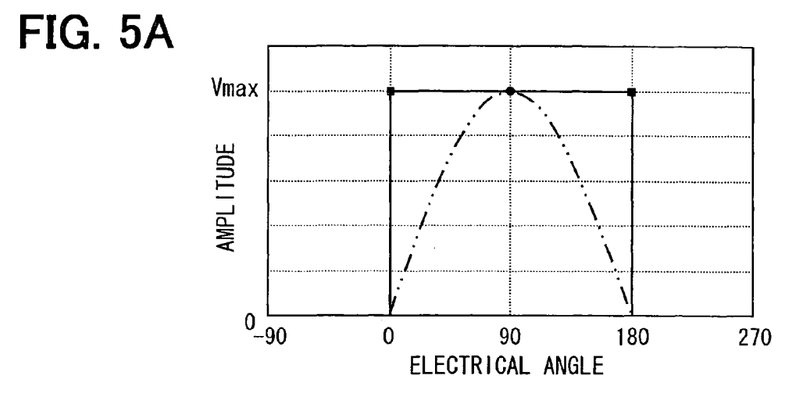
FIG. 5A is a characteristic diagram illustrating an example of a drive signal applied to a coil of the stepping motor in FIG. 1.
Figure 5B:
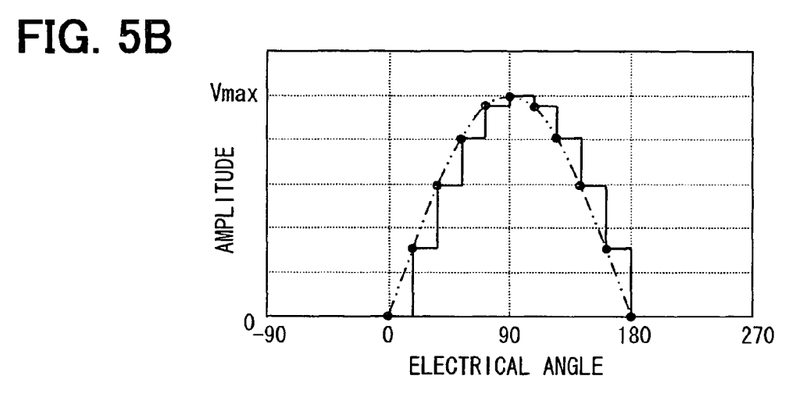
FIG. 5B is a characteristic diagram illustrating an example of the drive signal applied to the coil of the stepping motor in FIG. 1.
Figure 5C:
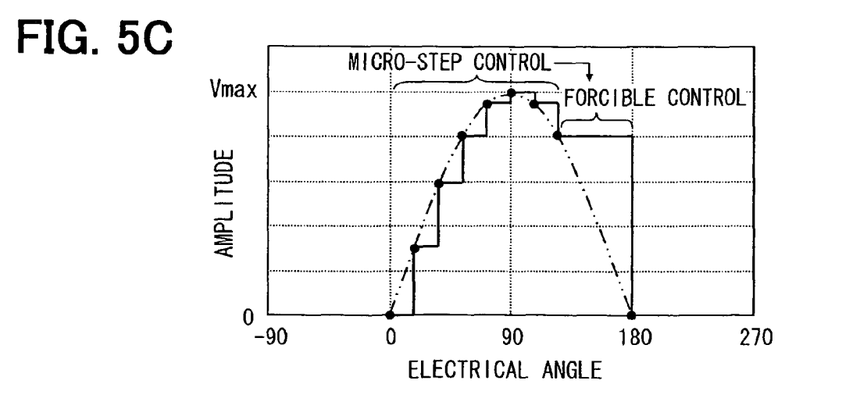
FIG. 5C is a characteristic diagram illustrating an example of the drive signal applied to the coil of the stepping motor in FIG. 1.

Next, characterizing portions of the HUD device 1 for the vehicle will be described. In the HUD device 1, the drive signals to the coils 46a, 46b of respective phases A, B are controlled such that their amplitudes (voltage magnitude in the present embodiment) correspond to the electrical angle of the stepping motor 40 as illustrated in FIGS. 5A to 5C to two-phase excite the stator 44. Accordingly, the drive signals to the coils 46a, 46b of respective phases are controlled to be a maximum amplitude (Vmax) or minimum amplitude (0) illustrated in FIGS. 5A to 5C at a stabilizing point θs at which the detent torque is maximized every substantially 90 degrees of the electrical angle. FIGS. 5A to 5C respectively illustrate characteristics in the case of full-step control, micro-step control, and forcible control, which are described in greater detail hereinafter, with respect to the drive signal to one of the coils 46a of phase A.

Figure 6:
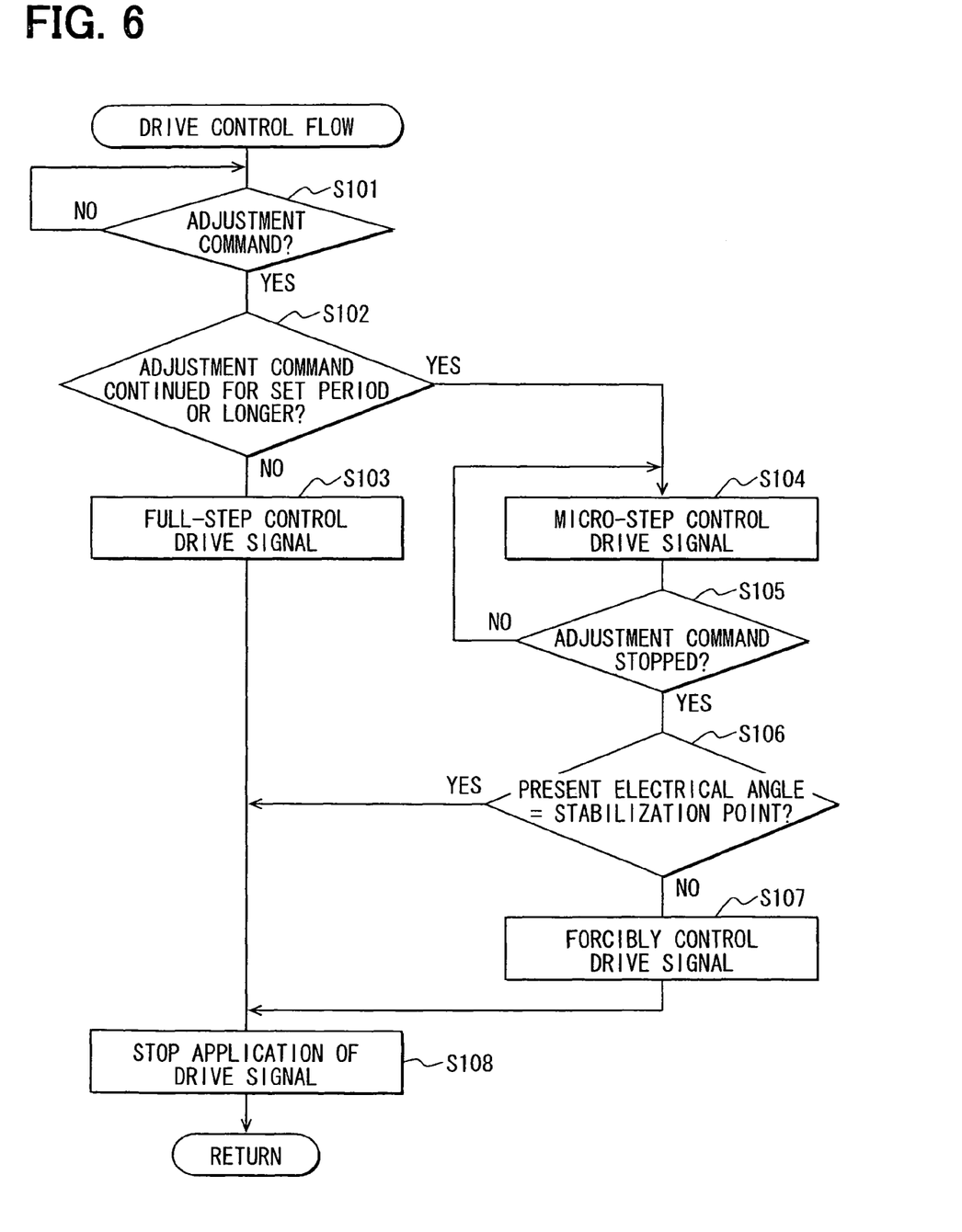
FIG. 6 is a flow chart illustrating a flow of drive signal control performed by a display control circuit in FIG. 1.

In the present embodiment, in particular, the electrical angle of the stepping motor 40 in the magnetic neutral state is set at any stabilizing point θs by properly switching control modes for the drive signals to the coils 46a, 46b of respective phases. Accordingly, a flow of drive signal control that the display control circuit 72 performs through the execution of a computer program will be described below in detail with reference to FIG. 6. The drive signal control flow in FIG. 6 is started upon turning on of an engine switch of the vehicle, and ended upon turning off of the engine switch.

At S101, it is determined whether the upward adjustment command or downward adjustment command is given based on the command signal from the adjustment switch 60. As a result, as long as it is determined that neither adjustment command is given, S101 is repeated with the application of the drive signal stopped to any of the coils 46a, 46b of respective phases A, B. On the other hand, if it is determined that either one of the adjustment commands is given, control proceeds to S102.

At S102, to which control proceeds if it is determined at S101 that the upward adjustment command or downward adjustment command is sent out, it is determined whether the adjustment command, which has been determined to be issued, is continuing for a set period T or longer, based on the command signal from the adjustment switch 60. In other words, in the present embodiment, it is determined whether the set period T or longer elapses after the operation of the adjustment switch 60 for inputting the upward adjustment command or downward adjustment command has been started. The set period T is set at about 0.5 second, for example, not to bring a sense of discomfort or stress to a vehicles occupant due to a period after the start of operation of the adjustment switch 60 until the display position of the virtual image 36 changes. However, as a matter of course, another value may be employed for the set period T.

The adjustment switch 60 is momentarily (for a short time) pressed, so that the adjustment command is stopped within the set period T. If negative determination is made at S102 as a result of the above, the adjustment command is considered to be commanding the full-step control, and control proceeds to S103. At S103, the drive signals to the coils 46a, 46b of respective phases A, B are full-step controlled. The full-step control is as illustrated in FIG. 5A, control for changing the drive signal from the present stabilizing point θs to its adjacent next stabilizing point θs in a direction in accordance with the type of the adjustment command. In the present embodiment, the full-step control is performed only once (i.e., electrical angle is changed by 90 degrees). Alternatively, the full-step control may be repeated multiple times (i.e., in the case of four-time repeat, for example, electrical angle is changed by 360 degrees).

On the other hand, if positive determination is made at S102 in FIG. 6 as a result of the continuation of the adjustment command for the set period T or longer through a lengthy (for a long time) pressing of the adjustment switch 60, the adjustment command is considered to be commanding the micro-step control, and control proceeds to S104. At S104, the drive signals to the coils 46a, 46b of respective phases A, B are micro-step controlled. As illustrated in FIG. 5B, the micro-step control is control for changing the drive signal from the present electrical angle to the subsequent electrical angle that is a set angle Δθ away therefrom in the direction in accordance with the type of the adjustment command, the set angle Δθ being smaller than an interval between the stabilizing points θs (i.e., substantially 90 degrees). The set angle Δθ is set at 18 degrees as in FIGS. 5A to 5C, for example, such that adjustment of the display position of the virtual image 36 is made smooth. However, needless to say, another value may be used for the set angle Δθ.

At S105, to which control proceeds after the electrical angle of the drive signal is changed by the set angle Δθ at S104 in FIG. 6, it is determined whether the adjustment command, which has been determined at the most recent S101 to be issued, is stopped. In other words, switching from the determination that the adjustment command is given to the determination that the adjustment command is not given, is determined. As long as negative determination is made at S105, the micro-step control of the drive signal is continued each time by the set angle Δθ in accordance with the adjustment command through repeat execution of S104, S105.

On the other hand, if positive determination is made at S105, the adjustment command is considered to be stopped as a result of release of the lengthy pressing of the adjustment switch 60. Then, control proceeds to S106 to determine whether the present electrical angle is the stabilizing point θs. As a result, if negative determination is made as a result of the present electrical angle being shifted from the stabilizing point θs, control proceeds to S107 at which the drive signals to the coils 46a, 46b of respective phases A, B are forcibly controlled. As illustrated in FIG. 5C, the forcible control is control for changing the drive signal from the present electrical angle to the front-side as well as closest stabilizing point θs in a change direction of the electrical angle in the micro-step control at the most recent S104.

After the full-step control is ended at S103; and when positive determination is made at S106; in addition to after the forcible control is ended at S107 in FIG. 6, control proceeds to S108 to stop the application of the drive signal ☐ to any of the coils 46a, 46b of respective phases A, B. After this, control returns to S101, and thus S101 to S108 are repeated until the engine switch is put into an OFF state.

In the above-described HUD device 1, with respect to the adjustment command of the micro-step control for controlling the drive signal of the stepping motor 40 such that the electrical angle of the drive signal changes each time by the set angle Δθ which is smaller than the interval of the stabilizing points θs, as long as the adjustment command is determined to be issued, the micro-step control is performed. The virtual image 36 is obtained as a result of the projection of the reflected image on the reflecting mirror 32 that is driven by the rotation of the stepping motor 40, to which the drive signal is applied. In the micro-step control, the adjustment of the display position of this virtual image 36 can be smoothly carried out through a small change of the electrical angle each time by the set angle Δθ.

Furthermore, in the HUD device 1, it is assumed that with respect to the adjustment command of the micro-step control, at the time of switching from the determination that the command is given to the determination that the command is not given, the electrical angle is out of the stabilizing point θs that appears in accordance with the detent torque. That is, it is assumed that in the case of switching from the determination that the command is given to the determination that the command is not given with respect to the adjustment command of the micro-step control, the electrical angle as of the time of the determination that the adjustment command is not given, is shifted from the stabilizing point that appears at every predetermined electrical angle in accordance with the detent torque. However, if the present electrical angle is out of the stabilizing point θs, the drive signal is forcibly controlled such that the electrical angle changes to the stabilizing point θs. Accordingly, a rotation retaining effect due to the detent torque is reduced, so that the stepping motor 40 can be prevented from losing steps. Particularly, the stabilizing point θs to which the drive signal is forcibly controlled is the electrical angle further on the front side than the electrical angle at the start of the forcible control in the direction of change of the electrical angle through the micro-step control immediately therebefore. Consequently, the stepping motor 40 can also be prevented from losing steps due to inertia action on the rotor 41 immediately after the micro-step control. Because of these, in the stepping motor 40, discrepancy between the mechanical angle corresponding to the rotation angle of the reflecting mirror 32, and the electrical angle is not easily caused. As a result, reliability of the adjustment of the display position of the virtual image 36 can be improved.

Moreover, in the forcible control by the HUD device 1, the electrical angle of the drive signal is forcibly controlled to the stabilizing point θs, which is the closest to the electrical angle at the start of the forcible control on the front side in the direction of change of the electrical angle through the previous micro-step control. Accordingly, reduction of reliability as a result of a sense of discomfort for the vehicle occupant due to a considerable change of the display position of the virtual image 36 in the opposite direction from the position before the stop of the adjustment command, can also be avoided.

In the case where with respect to the adjustment command of the micro-step control, the electrical angle as of the time of determination that the command is not given, is shifted from the stabilizing point, the drive signal is forcibly controlled to the stabilizing point that is further on the front side than the present electrical angle in the change direction of the electrical angle in the micro-step control. Accordingly, in the stepping motor, reduction of reliability because of the synchronism loss as a result of the shift of the mechanical angle corresponding to the rotation angle of the reflecting mirror from the electrical angle due to the inertia action on the rotating element immediately after the micro-step control can be avoided. Furthermore, the reduction of reliability because of a sense of discomfort for a vehicle occupant due to the change of the display position of the virtual image in the opposite direction from before the stop of the adjustment command can also be avoided.

In the case where with respect to the adjustment command of the micro-step control, the electrical angle as of the time of determination that the command is not given, is shifted from the stabilizing point, the drive signal is forcibly controlled to the stabilizing point that is the closest to the present electrical angle on the front side in the direction of the change of the electrical angle in the micro-step control. Therefore, the reduction of reliability as a result of an enormous change of the display position of the virtual image in the opposite direction from before the stop of the adjustment command can be avoided.

Additionally, in the HUD device 1, when the adjustment command of the full-step control for controlling the drive signal of the stepping motor 40 such that its electrical angle changes from the present stabilizing point θs to the following stabilizing point θs is determined to be issued, the full-step control is performed from the stabilizing points θs as of the time of the determination that the adjustment command is given. The virtual image 36 is obtained as a result of the projection of the reflected image on the reflecting mirror 32 that is driven by the rotation of the stepping motor 40, to which the drive signal is applied. In the full-step control, the adjustment of the display position of this virtual image 36 can be promptly made by a great change of the electrical angle between the stabilizing points θs. In the case in which the adjustment command of the micro-step control is given instead of the adjustment command of the full-step control, the adjustment of the display position of the virtual image 36 can be smoothly made as described above. In this manner, the display position adjustment in different modes is made possible in accordance with the type of the adjustment command, which can contribute to the improvement in reliability in accordance with the diversification of preference of the vehicle occupant.

In the above-described embodiment, the display control circuit 72, which performs S101, S102, may correspond to a determining means; the display control circuit 72, which performs S103, may correspond to a full-step control means; the display control circuit 72, which performs S104, S105, may correspond to a micro-step control means; and the display control circuit 72, which performs S106, S107, may correspond to a forcible control means.

Modifications of the above embodiment will be described. The embodiment of the invention has been described so far. Nevertheless, the invention is not interpreted exclusively within the above embodiment, and it may be applied to various embodiments without departing from the scope of the invention.

Specifically, at S107 in the drive signal control flow, the forcible control for changing the drive signal from the present electrical angle to the stabilizing point θs further on the front side than the closest stabilizing point θs in the change direction of the electrical angle in the micro-step control at the most recent S104 may be carried out. Or, at S107, the forcible control for changing the drive signal from the present electrical angle to the front-side and desirably the closest stabilizing point θs in the opposite direction from the direction of the change of the electrical angle in the micro-step control at most recent S104 may be carried out. Furthermore, in the drive signal control flow, after the adjustment command is determined at S101 to be issued, control may skip S102, S103, which are related to the full-step control, and only the micro-step control after S104 may be performed.

In addition, besides the permanent magnet type of the above embodiment, for example, a hybrid type may be employed for the stepping motor 40 as long as it is a motor in which the stabilizing point in accordance with the detent torque appears. Other than the liquid crystal panel of the above embodiment, those which display the light-emitting image by means of an electro-luminescence (EL) panel or an indicator, for example may be used for the display 20. Lastly, for the projection member, which projects the reflected image on the reflecting mirror, for example, a combiner provided exclusively for the HUD device 1 may be adopted instead of the windshield 4 fixed to the vehicle as in the above embodiment.

Additional advantages and modifications will readily occur to those skilled in the art. The invention in its broader terms is therefore not limited to the specific details, representative apparatus, and illustrative examples shown and described.

What is claimed is:

1. A head up display device for a vehicle, comprising:
a display configured to display a light-emitting image;
an optical system that includes a reflecting mirror, which is disposed rotatably relative to the display to reflect the image displayed by the display, and that is configured to project the image reflected on the reflecting mirror onto a projection member of the vehicle and to thereby display a virtual image of vehicle-related information on the projection member;
a stepping motor configured to rotate the reflecting mirror as a result of application of a drive signal to the stepping motor and thereby to adjust a display position of the virtual image, wherein:
the drive signal has an amplitude in accordance with an electrical angle; and
a stabilizing point of the stepping motor appears at every predetermined electrical angle in accordance with detent torque of the stepping motor; and
a control system configured to control the drive signal such that the electrical angle changes in accordance with an adjustment command from an outside, the control system including:
a determining means for determining whether the adjustment command for micro-step control is given or not, wherein through the micro-step control, the drive signal is controlled such that the electrical angle changes by a set angle each time, the set angle being smaller than a stabilizing point interval;
a micro-step control means for performing the micro-step control as long as the determining means determines that the adjustment command for the micro-step control is given; and
a forcible control means for forcibly controlling the drive signal such that the electrical angle changes to the stabilizing point, wherein when determination made by the determining means whether the adjustment command for the micro-step control is given or not switches from determination that the adjustment command is given to determination that the adjustment command is not given, the forcible control means forcibly controls the drive signal, provided that the electrical angle as of a time of the determination that the adjustment command is not given is shifted from the stabilizing point.

2. The head up display device according to claim 1, wherein the forcible control means forcibly controls the drive signal such that the electrical angle changes to the stabilizing point, which is further on a front side than the electrical angle as of the time of the determination that the adjustment command is not given in a direction of change of the electrical angle by the micro-step control means.

3. The head up display device according to claim 2, wherein the forcible control means forcibly controls the drive signal such that the electrical angle changes to the stabilizing point, which is on the front side in the direction of the change of the electrical angle by the micro-step control means and is the closest to the electrical angle as of the time of the determination that the adjustment command is not given.

4. The head up display device according to claim 1, wherein the control system includes:
the determining means for determining whether the adjustment command for the micro-step control is given or not and for determining whether the adjustment command for full-step control is given or not, wherein through the full-step control, the drive signal is controlled such that the electrical angle changes from a present stabilizing point to its subsequent stabilizing point; and
a full-step control means for performing the full-step control when it is determined by the determining means that the adjustment command for the full-step control is given.

* * * * *